(12) United States Patent
Melander

(10) Patent No.: US 9,654,390 B2
(45) Date of Patent: May 16, 2017

(54) METHOD AND APPARATUS FOR IMPROVING CLOUD ROUTING SERVICE PERFORMANCE

(71) Applicant: Cisco Technology, Inc., San Jose, CA (US)

(72) Inventor: Bob Christer Melander, Sigtuna (SE)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 14/016,435

(22) Filed: Sep. 3, 2013

(65) Prior Publication Data

US 2015/0063366 A1 Mar. 5, 2015

(51) Int. Cl.
*H04L 12/713* (2013.01)
*H04L 12/771* (2013.01)

(52) U.S. Cl.
CPC ............ *H04L 45/586* (2013.01); *H04L 45/56* (2013.01)

(58) Field of Classification Search
None
See application file for complete search history.

(56) References Cited

U.S. PATENT DOCUMENTS

| 2003/0031180 | A1* | 2/2003 | Datta et al. ................... 370/392 |
| 2007/0014231 | A1* | 1/2007 | Sivakumar et al. .......... 370/216 |
| 2011/0032830 | A1* | 2/2011 | Merwe et al. ................ 370/251 |
| 2011/0075667 | A1 | 3/2011 | Li et al. |
| 2011/0075674 | A1 | 3/2011 | Li et al. |
| 2011/0134931 | A1* | 6/2011 | Merwe et al. ................ 370/401 |
| 2012/0151057 | A1 | 6/2012 | Paredes et al. |
| 2013/0044636 | A1 | 2/2013 | Koponen et al. |
| 2013/0086200 | A1 | 4/2013 | Alanis et al. |

OTHER PUBLICATIONS

Gupta et al; Improving HPC Application Performance in Cloud through Dynamic Load Balancing; CCGRUD, 2013 13th IEEE/ACM Int. Symposium, IEEE; 2013-05012, pp. 402-409.

* cited by examiner

*Primary Examiner* — Steven H Nguyen
(74) *Attorney, Agent, or Firm* — P. Su

(57) ABSTRACT

In one embodiment, a method includes creating a logical router on a first router, the first router being supported on a first node, the logical router being created for a tenant. The method also includes determining whether a mode change is indicated, and migrating the logical router from the first router to the second router when it is determined that the mode change is indicated. The mode change is associated with migrating the logical router from the first router to a second router, where the second router is also supported on the first node.

10 Claims, 5 Drawing Sheets

METHOD AND APPARATUS FOR IMPROVING CLOUD ROUTING SERVICE PERFORMANCE

TECHNICAL FIELD

The disclosure relates generally to routing and processing packets. More particularly, the disclosure relates to a system within a cloud network that may efficiently switch between a logical cloud router provided as a software router and a logical cloud router provided as a hardware router.

BACKGROUND

Logical cloud routers used to route packets between tenants associated with a cloud network are often implemented as software-based routers running on a virtual machine, or using constructs such as Linux namespaces. While software-based routers have become increasingly powerful, the packet forwarding performance of software-based routers is generally not as good as the packet forwarding performance of hardware-based routers.

Although logical routers may be implemented as hardware-based routers due to the packet forwarding performance of hardware-based routers, the use of hardware-based routers may be insufficient with regards to handling volumes of traffic. As will be appreciated by those skilled in the art, a virtual context may be created on a hardware router to support an instance of a logical router. The use of software-based routers is generally more scalable than the use of hardware-based routers, as software-based routers may be instantiated in much larger numbers in virtual machines, for example, than virtual contexts may be created in hardware-based routers.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
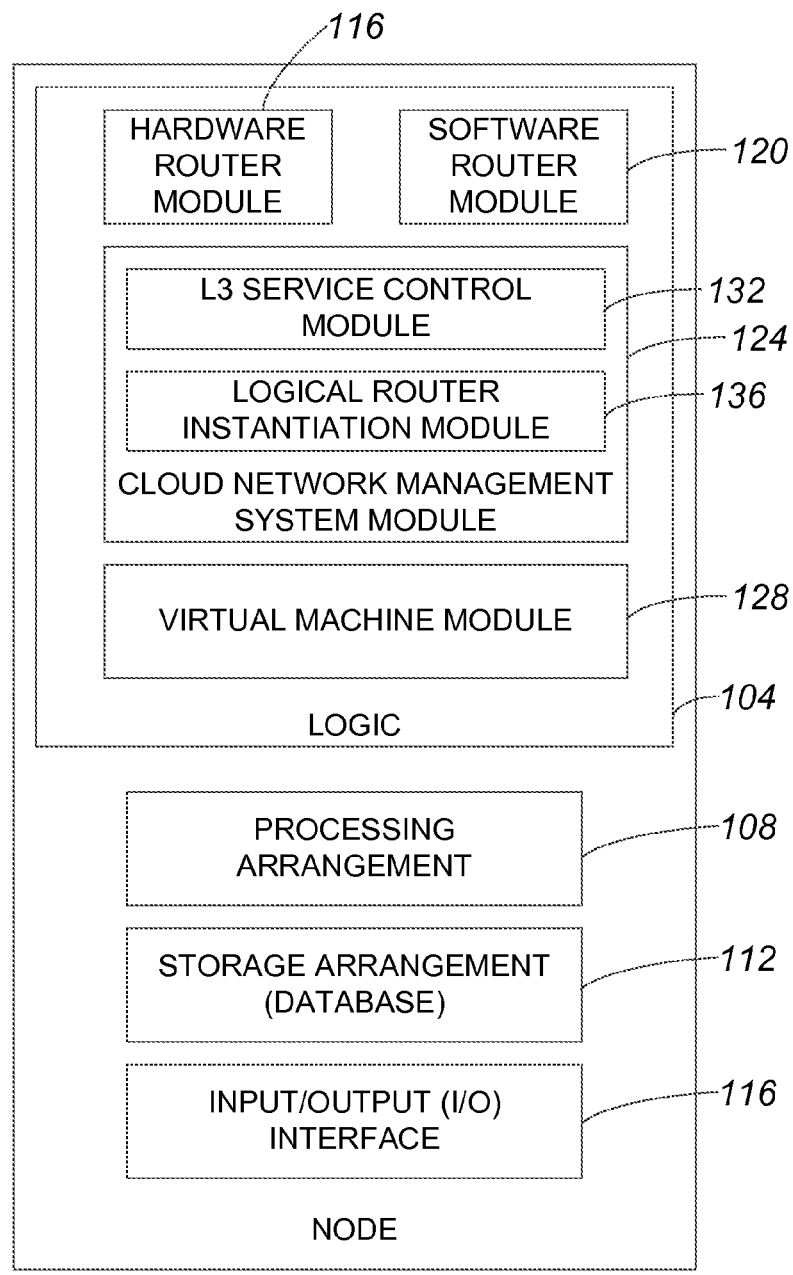
FIG. 1 is a block diagram representation of a node that supports a hardware router and a software router in accordance with an embodiment.

According to one aspect, a method includes creating a logical router on a first router, the first router being supported on a first node, the logical router being created for a tenant. The method also includes determining whether a mode change is indicated, and migrating the logical router from the first router to the second router when it is determined that the mode change is indicated. The mode change is associated with migrating the logical router from the first router to a second router, where the second router is also supported on the first node.

Description

As will be understood by those skilled in the art, a cloud network is generally a scalable, virtual network that interconnects cloud resources, e.g., virtual machines. A cloud network may be constrained to a single tenant or interconnect resources owned by multiple tenants. Routing services provided within a cloud network generally allow packets to be routed between different Internet Protocol (IP) networks.

Logical routers used within a cloud network, or logical cloud routers, may generally be hardware-based or software-based. Hardware-based logical routers may be application specific integrated circuit (ASIC) based logical routers, and are generally characterized by relatively high packet forwarding performance. While software-based logical routers are relatively powerful, the packet forwarding performance of software-based logical routers is not as high as the packet forwarding performance of software-based logical routers. However, software-based logical routers are typically more scalable than hardware-based logical routers. In general, software-based routers in virtual machines may be instantiated in larger numbers that virtual contexts may be created on a hardware-based router.

In one embodiment, a cloud network device may effectively implement a software-based logical cloud when performance and/or service requirements, e.g., packet forwarding performance, may be accomplished using the software-based logical router, and implement a hardware-based logical router when performance and/or service requirements are such that the use of the hardware-based logical router is merited. Such a cloud network device may effectively switch between being used as a hardware router and used as a software router in real-time and/or substantially on-demand, as for example when a mode change trigger which is obtained indicates that a switch is to be made.

By allowing a logical cloud router or a logical router that is associated with a cloud network to be changed, e.g., in real-time and/or substantially on-demand, between operating as a software-based logical router and a hardware-based logical router, an appropriate router may be efficiently selected for use based on current performance specifications. In one embodiment, a logical router may be provided as a hardware-based logical router when performance is critical, and as a software-based logical router when performance is less critical. For example, a cloud network device that is capable of instantiating a software-based logical router and a hardware-based logical router may be configured to create a hardware-based logical router when a relatively high packet forwarding performance is desired, and to create a software-based logical router when a relatively high packet forwarding performance is not necessary.

In one embodiment, a cloud network device or a node includes a hardware router component and a software router component. The node may effectively switch between operating as a hardware router and operating as a software router based on a mode change trigger, or a trigger that is arranged to indicate whether the node is to operate as a hardware router or as a software router. Referring initially to FIG. 1, a node that supports a hardware router and a software router will be described in accordance with an embodiment. A node 100, which may be a cloud network device such as a computing device, is generally arranged to operate as a router to route packets within a network. Node 100 includes logic 104, a processing arrangement 108, a storage arrangement 112, and an input/output (I/O) interface 116. Logic 104, which may include hardware and/or software logic, includes a hardware router module 116, a software router module 120, a cloud network management system module 124, and a virtual machine module 128.

Cloud network management system module 124 is generally configured to support the operation of hardware router module 116 and software router module 120, as appropriate, to forward packets to and from tenants in a cloud network. Cloud network management system module 124 may instantiate software-based logical routers, e.g., routers running in virtual machines and/or namespaces, as well as hardware-based logical routers, e.g., using virtual contexts. A logical router may be reconfigured by cloud network management system module 124 during run-time. Any suitable method may be used to reconfigure the logical router during run-time. Suitable methods may include, but are not limited to including, utilizing dedicated administrative networks and dedicated network interface cards (NICs) associated with a logical router.

Cloud network management system module 124 includes a layer 3 (L3) service control module 132, and a logical router instantiation module 136. L3 service control module 132 is configured to determine when a logical router is to be migrated from being a software-based logical router to being a hardware-based logical router, and vice versa. In one embodiment, L3 service control module 132 may obtain a trigger arranged to indicate that a logical router is to be migrated from a software router to a hardware router, or vice versa, and effectively configure the logical router in response to the trigger. Logical router instantiation module 136 is arranged to instantiate a logical router on node 100 using either hardware router module 116 or software router module 120.

Virtual machine module 128 is configured to instantiate and to support a virtual machine on node 100. Virtual machine module 128 is further configured to support a software-based logical router running on a virtual machine. As will be appreciated by those skilled in the art, a virtual machine may effectively provide isolation between different tenants supported by node 100, and provide for overlapping address spaces and policies.

Processing arrangement 108 generally includes at least one processor which is arranged to execute logic 104 that is software logic. Storage arrangement 112 may be a database or any other arrangement that may store data, e.g., information relating to the configuration of a logical router. I/O interface 116 may include at least one I/O port (not shown), and is arranged to allow node 100 to send and receive packets or, more generally, data on a network. A trigger such as a mode change trigger arranged to indicate that a logical router is to be migrated may also be obtained through I/O interface 116.

Figure 2:
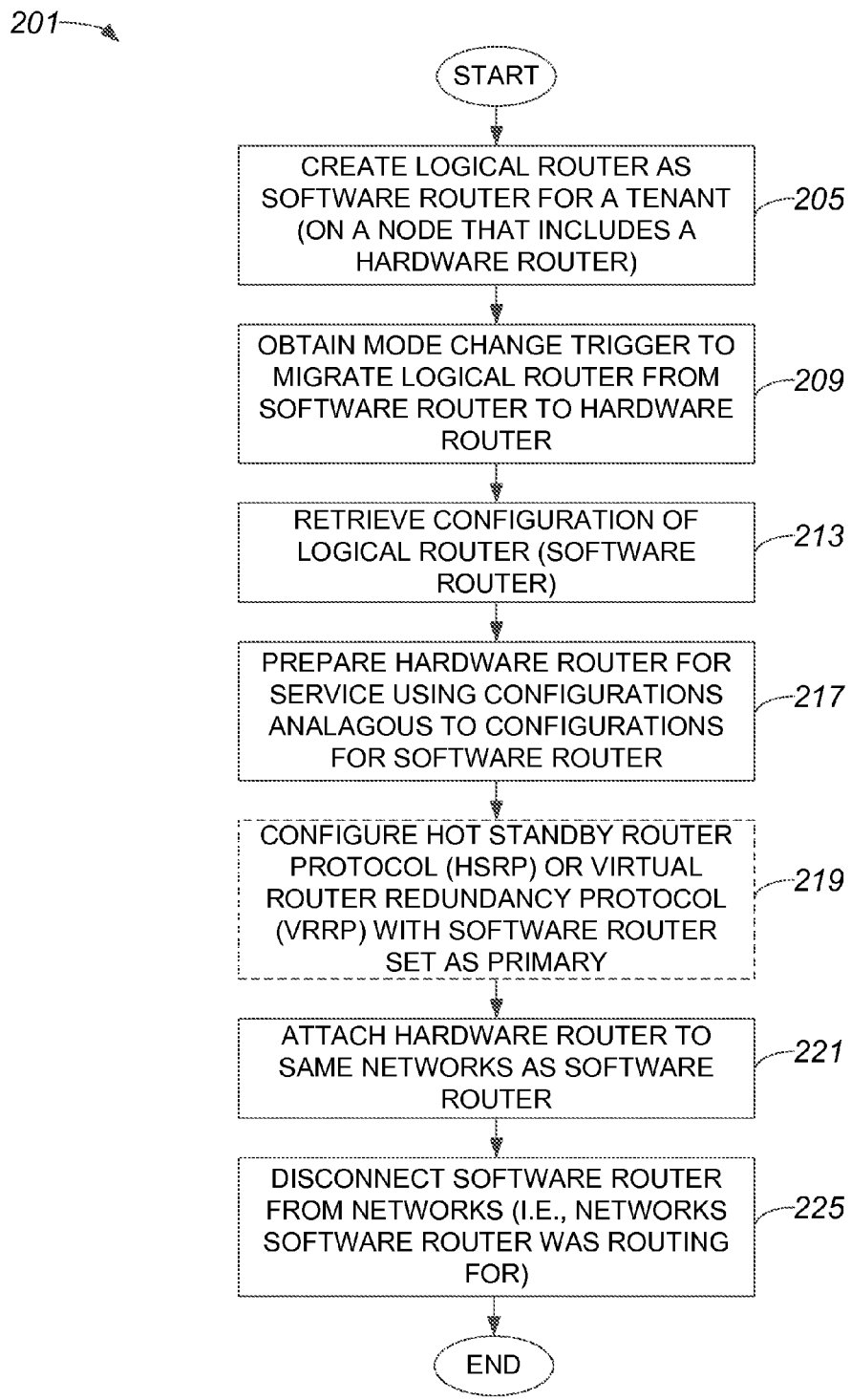
FIG. 2 is a process flow diagram which illustrates a method of switching a node from substantially functioning as a software router to substantially functioning as a hardware router in accordance with an embodiment.

In one embodiment, a node that is configured to operate as a router may generally operate as a software router, and may effectively switch to operating as a hardware router when certain conditions arise, e.g., when a mode change trigger is obtained. A mode change trigger may generally be associated with, but is not limited to being associated with, the desired performance of a router and/or the demand for routing services. FIG. 2 is a process flow diagram which illustrates a method of switching a node from substantially functioning as a software router to substantially functioning as a hardware router in accordance with an embodiment. A process 201 of effectively transitioning a node from operating as a software router to operating as a hardware router begins at step 205 in which a logical router is created, e.g., effectively instantiated or provided, for a tenant. The logical router is created as a software router the node. As previously mentioned, when the logical router is created as a software router, the logical router may be software-based and running on a virtual machine or a namespace.

Once a logical router is instantiated for a tenant as a software router, a mode change trigger is obtained in step 209. The mode change trigger typically provides an indication that the logical router is to be migrated from operating as the software router on the node to operating as a hardware router on the node.

A mode change trigger may be obtained by an L3 service control module which is part of an overall cloud network service management system on the node from any suitable source. In one embodiment, a mode change trigger may be obtained from a network administrator or generally from within an overall cloud network component that is effectively monitoring the node. A mode change trigger may be substantially obtained from an application programming interface (API) call made by a tenant, a cloud network administrator, and/or a service component associated with a cloud network. By way of example, a mode change trigger may be received by the node as a part of an orchestration process or function. An orchestration process may request and configure cloud resources according to different workflows that are offered as advanced cloud services to customers. The workflow for a relatively high bandwidth data transfer from a customer site to the cloud may first involve the setup of a provider VPN, e.g., a BGP/MPLS L3 VPN with provisioned bandwidth. Once a provider VPN is set up, a logical cloud router may be migrated from software to a hardware router as part of the workflow. Finally, a data transfer may be performed as a part of the workflow. Once that data transfer is complete, the inverse of the workflow may be performed, e.g., a logical cloud router may be migrated from the hardware router to software and a provider VPN may be setup.

After the mode change trigger is obtained, a configuration of the logical router is retrieved in step 213. The configuration of the logical router may be retrieved by the L3 service control module from the logical router itself or from a database. It should be appreciated that, as the logical router is software-based, the configuration of the logical router may effectively be the configuration of a software router.

In step 217, a hardware router associated with the node is prepared for service using a configuration analogous to the configuration of the software router, e.g., the configuration obtained in step 213. That is, the hardware router may be prepared to support the migration of the logical router from the software router to the hardware router. Preparing the hardware router for service may include, but is not limited to including, creating a virtual context for the hardware router.

In one embodiment, process flow may move from step 217 to step 219 in which the L3 service control module may optionally configure a hot standby router protocol (HSRP) or a virtual router redundancy protocol (VRRP) on both the software router and on the hardware router with the software router set as a primary router and the hardware router set as a backup router. In other words, the hardware router may effectively be set as a backup or standby router with respect to the software router.

The hardware router is attached or otherwise connected to the same networks, e.g., logical networks, as the software router in step 221. Attaching the hardware router to networks may involve, in one embodiment, reconfiguring a physical network substrate, as for example L2 switches, such that tenant traffic to and tenant traffic from the networks may be forwarded along suitable paths. Suitable paths may be, for example, paths with appropriate Quality of Service (QoS) properties.

Once the hardware router is attached to the networks, process flow proceeds to step 225 in which the software router is disconnected from the networks to which the hardware router was attached in step 221. That is, the software router is disconnected from the networks that it was routing for. The process of effectively transitioning a node from operating as a software router to operating as a hardware router is completed once the software router is disconnected from the networks.

Figure 3:
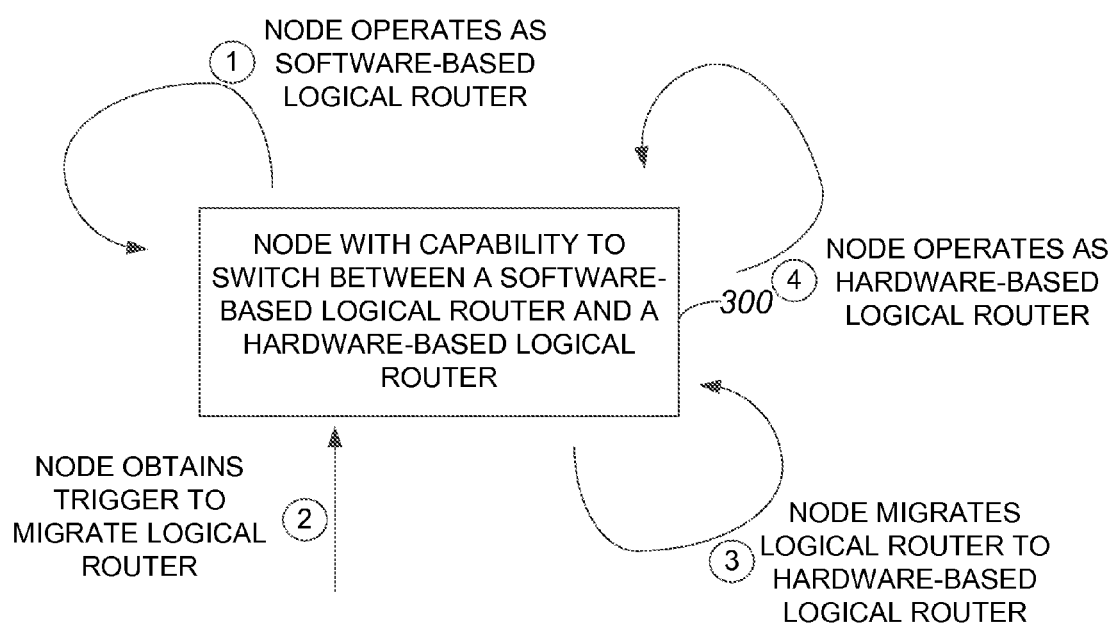
FIG. 3 is a diagrammatic representation of a process of operating a node that supports a hardware router and a software router to switch from acting as a software router to acting as a hardware router in accordance with an embodiment.

With reference to FIG. 3, the operation of a node that may dynamically switch from operating as a software router to operating as a hardware router substantially on-demand during runtime will be described in accordance with an embodiment. A node 300 which has the capability to switch between operating as a software router and a hardware router initially, at a time T1, operates as a software router, or a software-based logical router. At a time T2, node 300 obtains a trigger which effectively indicates that node 300 is to migrate the logical router from a software-based logical router to a hardware-based logical router. After the trigger is obtained, node 300 migrates the logical router from a software-based logical router to a hardware-based logical router at a time T3. At a time T4, node 300 operates as a hardware-based logical router.

Figure 4:
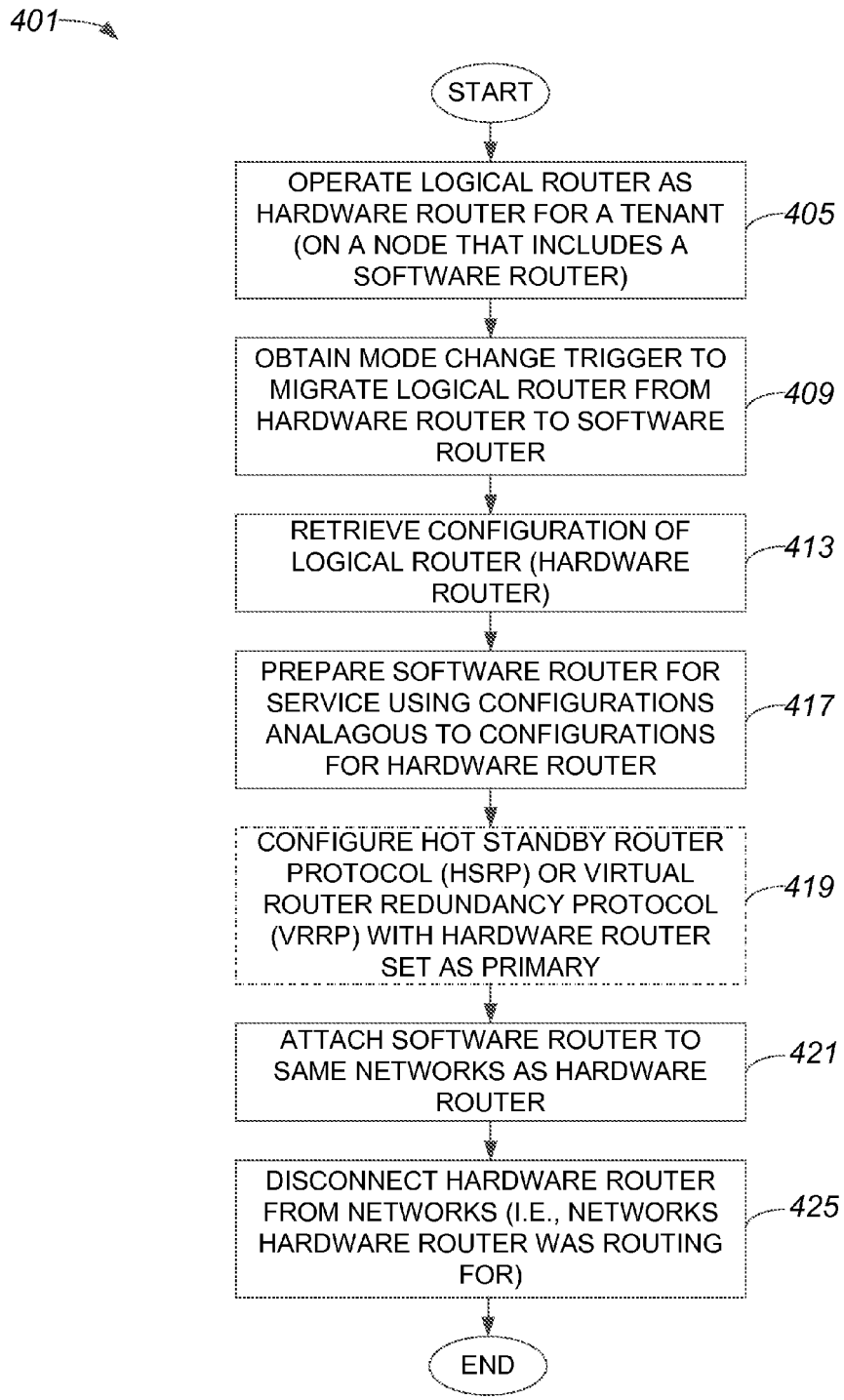
FIG. 4 is a process flow diagram which illustrates a method of switching a node from substantially functioning as a hardware router to substantially functioning as a software router in accordance with an embodiment.

Although a node which may operate as a software router and as a hardware router may generally be configured to operate as a software router unless a trigger indicates that the node is to operate as a hardware router, a node may instead operate as a hardware router unless a trigger indicates that the node is to operate as a software router. By way of example, when routing requirements are such that the packet forwarding performance of a hardware router is typically needed, a logical router instantiated on a node may effectively default to being hardware-based. FIG. 4 is a process flow diagram which illustrates a method of switching a node from substantially functioning as a hardware router to substantially functioning as a software router in accordance with an embodiment. A process 401 of effectively transitioning a node from operating as a hardware router to operating as a software router begins at step 405 in which a logical router is created for a tenant. The logical router is created as a hardware-based logical router on the node.

Once a logical router is created for a tenant as a hardware router, a mode change trigger is obtained in step 409. The mode change trigger typically provides an indication that the logical router is to be migrated from being a hardware-based logical router to being a software-based logical router.

A mode change trigger may be obtained from any suitable source by an L3 service control module which is part of an overall cloud network service management system on the node. After the mode change trigger is obtained, a configuration of the logical router is retrieved in step 413. The configuration of the logical router may be retrieved by the L3 service control module from the logical router itself or from a database. It should be appreciated that, as the logical router is a hardware-based logical router, the configuration of the logical router may effectively be the configuration of a hardware router.

In step 417, a software router associated with the node is prepared for service using a configuration analogous to the configuration of the hardware router, e.g., the configuration obtained in step 413. That is, the software router may be prepared to support the migration of the logical router from the hardware router to the software router. Preparing the software router for service may include, but is not limited to including, preparing a virtual machine or namespace to support a software-based logical router.

In one embodiment, process flow may move from step 417 to an optional step 419 in which the L3 service control module may optionally configure a HSRP or a VRRP on both the software router and on the hardware router with the hardware router set as a primary router and the software router set as a backup router. That is, the software router may effectively be set as a backup or standby router with respect to the hardware router.

The software router is attached or otherwise connected to the same networks, e.g., logical networks, as the hardware router in step 421. Attaching the hardware router to networks may involve, in one embodiment, reconfiguring a physical network substrate, as for example L2 switches, such that tenant traffic to and tenant traffic from the networks may be forwarded along suitable paths. Suitable paths may be, for example, paths with appropriate QoS properties.

Once the software router is attached to the networks, process flow proceeds to step 425 in which the hardware router is disconnected from the networks to which the software router was attached in step 421. The process of effectively transitioning a node from operating as a hardware router to operating as a software router is completed once the hardware router is disconnected from the networks.

Figure 5:
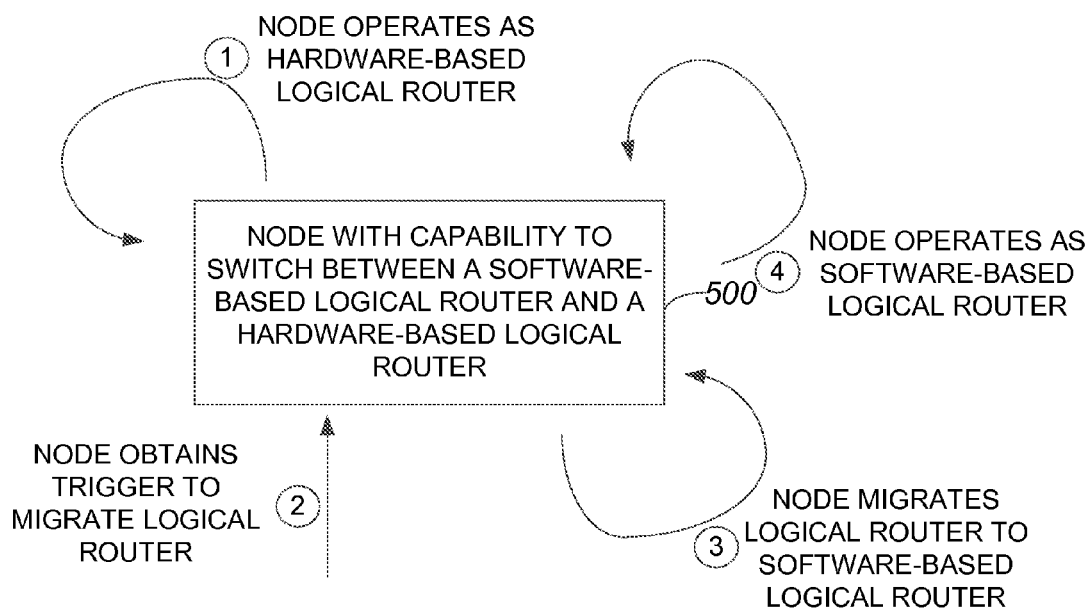
FIG. 5 is a diagrammatic representation of a process of operating a node that supports a hardware router and a software router to switch from acting as a hardware router to acting as a software router in accordance with an embodiment.

Referring next to FIG. 5, the operation of a node that supports a hardware router and a software router to switch from acting as a hardware router to acting as a software router will be described in accordance with an embodiment. A node 500 which has the capability to switch between operating as a hardware router and a software router initially, at a time T1, operates as a hardware router, or a hardware-based logical router. At a time T2, node 500 obtains a trigger which effectively indicates that node 500 is to migrate or otherwise transition the logical router from a hardware-based logical router to a software-based logical router. After the trigger is obtained, node 500 migrates the logical router from a hardware-based logical router to a software-based logical router at a time T3. At a time T4, node 500 operates as a software-based logical router.

Although only a few embodiments have been described in this disclosure, it should be understood that the disclosure may be embodied in many other specific forms without departing from the spirit or the scope of the present disclosure. By way of example, a system in which a logical router may be provided as a software-based router or as a hardware-based router, and may be migrated between the two on-demand and/or during runtime has been described as being suitable for use in a cloud network. It should be appreciated that such a system is not limited to being used in a cloud network, and may generally be used in any suitable network.

Any suitable condition may generally trigger a mode change from a software-based logical router to a hardware-based logical router, and vice versa. While a performance-related trigger has generally been described, a mode change is not limited to being triggered based on performance requirements. For example, a mode change may effectively be triggered by a tenant based on any suitable requirements. In one embodiment, a mode change may be triggered based on a time rather than a performance requirement. In another embodiment, a mode change may be triggered for maintenance and/or upgrade reasons.

Cloud service providers may, in one embodiment, use a system which may switch between a software-based logical router and a hardware-based logical router to more efficiently use and allocated their resources, e.g., by creating increased differentiation in their service offerings. Cloud platform users may, in one embodiment, more accurately utilize their virtual resources and achieve higher performance through the use of a system which may switch between a software-based logical router and a hardware-based logical router.

In general, a node with the capability to support a software router and a hardware router may be any suitable router in a cloud network. A node that supports a software router and a hardware router may generally also act as a gateway to the Internet for tenant networks. Such a node may be, in one embodiment, an ASIC-based hardware router that is configured to support a software-based router. Additionally, hardware routers that utilize service blades may be such that a service blade runs a hypervisor and is capable of deploying virtual machines. A software router may run, in one embodiment, substantially inside a hypervisor-based virtual machine. Hypervisor-based virtual machines may include, but are not limited to including, KVM or Xen. In another embodiment, a software router may run substantially inside a container-based virtual environment. Examples of container-based virtual environments include, but are not limited to including, Linux LXC, OpenVZ, Namespaces, Solaris Containers, and/or FreeBSD jails.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   creating a logical router on a first router, the first router being supported on a first node, the logical router being created for a tenant;
   determining whether a mode change is indicated, the mode change being associated with migrating the logical router from the first router to a second router, the second router being supported on the first node; and
   migrating the logical router from the first router to the second router when it is determined that the mode change is indicated, wherein the first router is a software router and the second router is a hardware router, and wherein determining whether the mode change is indicated includes determining whether a high bandwidth data transfer is planned from a customer site to a cloud.

2. The method of claim 1 further including:
   obtaining a mode change trigger, the mode change trigger being arranged to indicate whether the mode change is indicated; and
   retrieving a configuration of the logical router when it is determined that the mode change is indicated.

3. The method of claim 1 wherein migrating the logical router from the first router to the second router includes identifying at least one network to which the first router is attached, and attaching the second router to the at least one network.

4. The method of claim 3 wherein migrating the logical router from the first router to the second router further includes disconnecting the first router from the at least one network.

5. A method comprising:
   creating a logical router on a first router, the first router being supported on a first node, the logical router being created for a tenant;
   determining whether a mode change is indicated, the mode change being associated with migrating the logical router from the first router to a second router, the second router being supported on the first node;
   migrating the logical router from the first router to the second router when it is determined that the mode change is indicated;
   determining when to migrate the logical router from the second router back to the first router, wherein determining when to migrate the logical router from the second router back to the first router includes determining when a data transfer is complete; and
   migrating the logical router from the second router back to the first router when it is determined that the logical router is to migrate from the second router back to the first router, wherein it is determined that the logical router is to migrate from the second router back to the first router when the data transfer is complete.

6. A tangible, non-transitory computer-readable medium comprising computer program code, the computer program code, when executed, configured to:
   create a logical router on a first router, the first router being supported on a first node, the logical router being created for a tenant;
   determine whether a mode change is indicated, the mode change being associated with migrating the logical router from the first router to a second router, the second router being supported on the first node; and
   migrate the logical router from the first router to the second router when it is determined that the mode change is indicated, wherein the first router is a software router and the second router is a hardware router, and wherein the computer program code configured to determine whether the mode change is indicated is configured to determine whether a high bandwidth data transfer is planned from a customer site to a cloud.

7. The tangible, non-transitory computer-readable medium comprising computer program code of claim 6 further configured to:
   obtain a mode change trigger, the mode change trigger being arranged to indicate whether the mode change is indicated; and
   retrieve a configuration of the logical router when it is determined that the mode change is indicated.

8. The tangible, non-transitory computer-readable medium comprising computer program code of claim 6 wherein the computer program code configured to migrate the logical router from the first router to the second router is further configured to identify at least one network to which the first router is attached and to attach the second router to the at least one network.

9. The tangible, non-transitory computer-readable medium comprising computer program code of claim 8 wherein the computer program code configured to migrate the logical router from the first router to the second router is still further configured to disconnect the first router from the at least one network.

10. A tangible, non-transitory computer-readable medium comprising computer program code, the computer program code, when executed, configured to:
   create a logical router on a first router, the first router being supported on a first node, the logical router being created for a tenant;
   determine whether a mode change is indicated, the mode change being associated with migrating the logical router from the first router to a second router, the second router being supported on the first node;
   migrate the logical router from the first router to the second router when it is determined that the mode change is indicated;
   determine when to migrate the logical router from the second router back to the first router, wherein the computer program code configured to determine when to migrate the logical router from the second router back to the first router is configured to determine when a data transfer is complete; and
   migrate the logical router from the second router back to the first router when it is determined that the logical router is to migrate from the second router back to the first router, wherein it is determined that the logical router is to migrate from the second router back to the first router when the data transfer is complete.

* * * * *